(12) United States Patent  
Chen et al.

(10) Patent No.: US 12,537,716 B2  
(45) Date of Patent: Jan. 27, 2026

(54) DATA TRANSMISSION METHOD AND COMMUNICATION APPARATUS

(71) Applicant: Huawei Technologies Co., Ltd., Shenzhen (CN)

(72) Inventors: Qichang Chen, Shenzhen (CN); Min Zha, Shenzhen (CN); Dongdong He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 18/455,111

(22) Filed: Aug. 24, 2023

(65) Prior Publication Data

US 2023/0396464 A1  Dec. 7, 2023

Related U.S. Application Data

(63) Continuation of application No. PCT/CN2022/076743, filed on Feb. 18, 2022.

(30) Foreign Application Priority Data

Feb. 26, 2021  (CN) .......................... 202110217536.9

(51) Int. Cl.
*H04L 12/437* (2006.01)
*H04L 67/12* (2022.01)

(52) U.S. Cl.
CPC ............ *H04L 12/437* (2013.01); *H04L 67/12* (2013.01)

(58) Field of Classification Search
CPC ... H04L 12/437; H04L 12/42; H04L 12/4637; H04L 67/12; H04L 69/40; H04L 2012/421

See application file for complete search history.

(56) References Cited

U.S. PATENT DOCUMENTS

| | | | |
|---|---|---|---|
| 7,142,504 B1 * | 11/2006 | Uzun | H04L 12/437 370/224 |
| 7,342,877 B1 * | 3/2008 | Ervin | H04L 12/42 370/224 |
| 9,705,701 B2 * | 7/2017 | Ding | H04L 12/437 |

(Continued)

FOREIGN PATENT DOCUMENTS

| | | |
|---|---|---|
| EP | 1177656 B1 | 2/2008 |
| EP | 4020902 A1 | 6/2022 |

OTHER PUBLICATIONS 802.3-2018—IEEE Standard for Ethernet, IEEE Computer Society, Jun. 14, 2018, total 5600 pages.

(Continued)

*Primary Examiner* — Rasheed Gidado

(74) *Attorney, Agent, or Firm* — Conley Rose, P.C.

(57) ABSTRACT

In a data transmission method, each ring network interface is associated with a ring identifier, and a ring-incoming packet carries a ring identifier of a ring network interface through which the packet is first forwarded. When a node in a ring network detects a link fault in a process of transmitting a packet, the node determines, with reference to a ring identifier and a wrapping identifier carried in the packet, to perform wrapping or discard the packet. According to the method, two sub-ring networks of a dual-ring coupled ring network can be allowed to separately implement one time of wrapping.

20 Claims, 9 Drawing Sheets

(56) References Cited

U.S. PATENT DOCUMENTS

| | | | | |
|---|---|---|---|---|
| 11,784,850 B2 * | 10/2023 | Graham, III | ............ | H04L 41/06 |
| | | | | 370/242 |
| 2010/0135295 A1 * | 6/2010 | Burney | .................. | H04L 45/22 |
| | | | | 370/390 |

OTHER PUBLICATIONS 802.1CB-2017—IEEE Standard for Local and metropolitan area networks—Frame Replication and Elimination for Reliability, IEEE Computer Society, Sep. 28, 2017, total 102 pages.

802.1Qca-2015—IEEE Standard for Local and metropolitan area networks Bridges and Bridged Networks Amendment 24: Path Control and Reservation, IEEE Computer Society, Sep. 3, 2015, total 120 pages.

802.17-2011—IEEE Standard for Information technology—Telecommunications and information exchange between systems Local and metropolitan area networks—Specific requirements, Part 17: Resilient packet ring (RPR) access method and physical layer specifications, IEEE Computer Society, total 738 pages.

802.1Q-2018—IEEE Standard for Local and Metropolitan Area Networks Bridges and Bridged Networks, IEEE Computer Society, May 7, 2018, total 1993 pages.

IEC 62439-3, International Standard Norme Internationale, Industrial communication networks—High availability automation networks—Part 3: Parallel Redundancy Protocol (PRP) and High-availability Seamless Redundancy (HSR), IEC, Mar. 2016, total 358 pages.

\* cited by examiner

DATA TRANSMISSION METHOD AND COMMUNICATION APPARATUS

CROSS-REFERENCE TO RELATED APPLICATIONS

This application is a continuation of International Patent Application No. PCT/CN2022/076743 filed on Feb. 18, 2022, which claims priority to Chinese Patent Application No. 202110217536.9 filed on Feb. 26, 2021. The disclosures of the aforementioned applications are hereby incorporated by reference in their entireties.

TECHNICAL FIELD

The present disclosure relates to the field of in-vehicle networks, and in particular, to a data transmission method and a communication apparatus.

BACKGROUND

The Ethernet is very popular with network manufacturers for a simple and best-effort transmission manner and a standard interworking and interconnection mechanism of the Ethernet. High-reliability transmission and a fast fault recovery mechanism are needed for an in-vehicle network. The ring Ethernet that is based on a dual-ring coupled networking topology can have a capability of providing high-reliability transmission.

However, currently, for a multi-ring network, there is no inter-ring forwarding mechanism, namely, how to allow specific traffic on a ring network to be forwarded to a destination device on another ring network without causing a broadcast storm as the traffic is transmitted back and forth between the two ring networks. In addition, currently, only a case in which a single link fault occurs in transmission of an automotive Ethernet single-ring network is considered. As shown in FIG. 1, after a gateway 4 detects a link fault on a ring network interface (in other words, a packet cannot be transmitted between a gateway 1 and the gateway 4), the gateway 4 performs port-level loopback on the ring network interface (a sending unit of this port is directly wrapped to a receiving unit), and the gateway 4 continues to transmit the packet in a direction opposite to a previous transmission direction. In this solution, when a single link fault occurs on the single-ring network, a packet can be transmitted to the destination device in another transmission direction (a non-default transmission direction) of the ring network through wrapping. In a case of a single ring, if two link faults occur (for example, a packet cannot be transmitted between a gateway 2 and a gateway 3), the packet cannot reach the destination device. Therefore, the packet that has been wrapped needs to be discarded after a secondary fault occurs. As shown in FIG. 2, if the wrapped packet is not discarded, the wrapped packet is wrapped back and forth between the gateway 4 and the gateway 3, causing a broadcast storm, and finally exhausting a bandwidth between the gateway 4 and the gateway 3.

When the solution is applied to a multi-ring network, a data packet that has been wrapped across rings in the multi-ring network is discarded, and information carried in the packet is lost. However, in an actual case, when a secondary fault occurs on another ring network, a wrapped packet transmitted across rings still has an available path to reach a final destination device. Information carried in the packet is lost when the packet is discarded, and a vehicle body or driving control decision of an intelligent and self-driving vehicle is affected.

SUMMARY

The present disclosure provides a data transmission method and a communication apparatus, to resolve a problem of data transmission in a dual-ring ring topology through the Ethernet in an in-vehicle network, and allow two sub-ring networks of a dual-ring coupled ring network to separately implement wrapping, thereby improving reliability of data transmission in the in-vehicle network.

According to a first aspect, a data transmission method is provided. The method is applied to a first node in a multi-ring coupled ring network, and may also be applied to a component (for example, a chip, a chip system, or a processor) in the first node. The multi-ring coupled ring network includes a plurality of sub-rings. The method includes: The first node receives a first data packet, where the first node is a node in the multi-ring coupled ring network, the first data packet includes a ring identifier and a wrapping identifier of the first data packet, the ring identifier of the first data packet is a ring number value of any sub-ring in the multi-ring coupled ring network through which the first data packet is transmitted, and the wrapping identifier indicates that the first data packet is a wrapped data packet or a non-wrapped data packet; when the first node detects, on a first ring network interface, that a fault exists on a link between the first node and a second node, and the first data packet is a wrapped data packet, if the ring identifier of the first data packet is different from a ring identifier of the first ring network interface, the first node generates a second data packet, where the second data packet is a packet generated after the ring identifier of the first data packet is set to the ring identifier of the first ring network interface, the first ring network interface is a ring network interface belonging to the first node, the first node is connected to the second node through the first ring network interface, the first ring network interface is an interface through which the first node is to send the first data packet, and a ring identifier of each ring network interface in a multi-ring coupled ring network is a ring number value of a sub-ring to which the ring network interface belongs; the first node determines a second ring network interface based on the first ring network interface, where the second ring network interface is a ring network interface that belongs to the first node and that has a same ring identifier as that of the first ring network interface; and the first node forwards the second data packet through the second ring network interface.

According to the data transmission method provided in this embodiment of the present disclosure, when a link fault occurs in an in-vehicle network of a multi-ring coupled ring Ethernet, a ring network node determines, with reference to a ring identifier and a wrapping identifier that are carried in a packet, whether to perform wrapping on the packet. When the data packet is a wrapped packet and the ring identifier in the packet is inconsistent with the ring identifier of the ring network interface on which the link fault is detected, it indicates that wrapping has not been performed on the data packet in a sub-ring of the ring network interface on which the link fault is detected, and the data packet is allowed to continue to be transmitted in the in-vehicle network through wrapping. Therefore, the data packet can continue to be transmitted to a destination device, thereby improving reliability of data transmission in the in-vehicle network.

With reference to the first aspect, in some implementations of the first aspect, if the ring identifier of the first data packet is the same as the ring identifier of the first ring network interface, the first node discards the first data packet.

When the data packet is a wrapped packet and the ring identifier in the packet is inconsistent with the ring identifier of the ring network interface on which the link fault is detected, it indicates that wrapping has been performed once on the data packet in a sub-ring of the ring network interface on which the link fault is detected, and the data packet is discarded, to prevent the data packet from continuing to be unnecessarily transmitted in the ring network.

It should be noted that, discarding the first data packet may mean that the first data packet is not processed, or the first data packet is deleted.

With reference to the first aspect, in some implementations of the first aspect, when the wrapping identifier is a first value, the wrapping identifier indicates that the first data packet is a non-wrapped data packet; or when the wrapping identifier is a second value, the wrapping identifier indicates that the first data packet is a wrapped data packet. The method further includes: When the first node detects, on a first ring network interface, that a fault exists on the link between the first node and the second node, and the first data packet is a non-wrapped data packet, the first node generates a third data packet, where the third data packet is a packet generated after the wrapping identifier of the first data packet is set to the second value; and the first node forwards the third packet through the second ring network interface.

With reference to the first aspect, in some implementations of the first aspect, that the first node determines the second ring network interface based on the first ring network interface includes: The first node queries a ring network table based on the first ring network interface, and determines the second ring network interface corresponding to the first ring network interface. The ring network table indicates a correspondence between an ingress interface and an egress interface. The ingress interface indicates an interface that receives a data packet. The ingress interface is a ring network interface or a service interface. The egress interface indicates a ring network interface that forwards a data packet in the multi-ring coupled ring network.

According to a second aspect, a data transmission method is provided. The method is applied to a first node in a multi-ring coupled ring network, and may also be applied to a component (for example, a chip, a chip system, or a processor) in the first node. The multi-ring coupled ring network includes a first sub-ring and a second sub-ring that are adjacent to each other. The method includes: The first node receives a first data packet from a first ring network interface, where the first node is a node in the multi-ring coupled ring network, the first ring network interface is a ring network interface belonging to the first node, the first node is connected to a second node through the first ring network interface, the first node is connected to a third node through a second ring network interface, the second ring network interface is a ring network interface belonging to the first node, all ring network interfaces of the second node belong to the first sub-ring, all ring network interfaces of the third node belong to the second sub-ring, the first ring network interface belongs to the first sub-ring, the second ring network interface belongs to the second sub-ring, the first data packet includes a ring identifier of the first data packet and a destination medium access control (MAC) address of the first data packet, and the ring identifier of the first data packet is a ring number value of any sub-ring in the multi-ring coupled ring network through which the first data packet is transmitted; the first node determines, based on the ring identifier of the first data packet, the destination MAC address of the first data packet, and a ring identifier of the first ring network interface, whether a first entry exists in an inter-ring table, where a ring identifier of each ring network interface in the multi-ring coupled ring network is a ring number value of a sub-ring to which the ring network interface belongs, the inter-ring table includes a plurality of entries, each entry includes a correspondence between each of a packet ring identifier, a MAC address, and a ring identifier of a ring network interface used by the first node to receive a packet and an inter-ring network interface, and a ring identifier of the inter-ring network interface in each entry is different from the ring identifier of the ring network interface used by the first node to receive a packet; and if the first entry exists, the first node forwards the first data packet through an inter-ring network interface corresponding to the first entry, where a packet ring identifier in the first entry is the same as the ring identifier of the first data packet, a MAC address in the first entry is the same as the destination MAC address of the first data packet, and a ring identifier of a ring network interface used by the first node to receive a packet in the first entry is the same as the ring identifier of the first ring network interface.

According to the data transmission method provided in this embodiment of the present disclosure, an inter-ring forwarding trustlist table is introduced on an inter-ring node in an in-vehicle network of a dual-ring coupled ring Ethernet, and the table is used to control enabling of inter-ring communication of specific traffic. The inter-ring forwarding trustlist table matches only traffic received by a ring network interface, and an egress interface is only the ring network interface.

With reference to the second aspect, in some implementations of the second aspect, if the first entry does not exist, the first node ends an inter-ring forwarding procedure of the first data packet.

According to a third aspect, a data transmission method is provided. The method is applied to a first node in a multi-ring coupled ring network, and may also be applied to a component (for example, a chip, a chip system, or a processor) in the first node. The multi-ring coupled ring network includes N sub-rings. The method includes:

The first node receives a first data packet, where the first node is a node in the multi-ring coupled ring network, the first data packet includes N wrapping identifiers, the N wrapping identifiers are in a one-to-one correspondence with N sub-rings, N is greater than or equal to 2, and each wrapping identifier indicates that the first data packet is a wrapped data packet or a non-wrapped data packet in the corresponding sub-ring; when the first node detects, on a first ring network interface, that a fault exists on a link between the first node and the second node, if a wrapping identifier corresponding to a first sub-ring indicates that the first data packet is a non-wrapped data packet on the first sub-ring, the first node generates a second data packet, where the second data packet is a wrapped data packet of the first data packet on the first sub-ring, the first sub-ring is a sub-ring to which the first ring network interface belongs, the first ring network interface is a ring network interface belonging to the first node, the first node is connected to the second node through the first ring network interface, and the first ring network interface is an interface through which the first node is to send the first data packet; the first node determines a second ring network interface based on the first ring network interface, where the second ring network interface is a ring network interface that belongs to the first node and that has a same ring identifier as that of the first ring network interface; and the first node forwards the second data packet through the second ring network interface.

With reference to the third aspect, in some implementations of the third aspect, if the first data packet is a wrapped data packet on the first sub-ring, the first node discards the first data packet.

With reference to the third aspect, in some implementations of the third aspect, when the wrapping identifier is a first value, the wrapping identifier indicates that the first data packet is a non-wrapped data packet in a corresponding sub-ring; or when the wrapping identifier is a second value, the wrapping identifier indicates that the first data packet is a wrapped data packet in a corresponding sub-ring; and that the first node generates a second data packet includes: setting a value of a wrapping identifier corresponding to the first sub-ring in the first data packet to the second value, to obtain the second data packet.

According to a fourth aspect, the present disclosure provides a communication apparatus. The communication apparatus has a function of implementing the method according to the first aspect or any possible implementation of the third aspect, or has a function of implementing the method according to the third aspect or any possible implementation of the third aspect. The function may be implemented by hardware, or may be implemented by hardware executing corresponding software. The hardware or the software includes one or more units corresponding to the foregoing function.

According to a fifth aspect, the present disclosure provides a communication apparatus. The communication apparatus has a function of implementing the method according to the second aspect or any possible implementation of the second aspect. The function may be implemented by hardware, or may be implemented by hardware executing corresponding software. The hardware or the software includes one or more units corresponding to the foregoing function.

According to a sixth aspect, the present disclosure provides a communication device. The communication device includes at least one processor. The at least one processor is coupled to at least one memory. The at least one memory is configured to store a computer program or instructions. The at least one processor is configured to invoke the computer program or instructions from the at least one memory and run the computer program or instructions, so that the communication device performs the method according to the first aspect or any possible implementation of the first aspect, or performs the method according to the third aspect or any possible implementation of the third aspect.

In an example, the communication device may be the first node in the first aspect.

In another example, the communication device may be a component (for example, a chip or an integrated circuit) installed in the first node in the first aspect.

According to a seventh aspect, the present disclosure provides a communication device. The communication device includes at least one processor. The at least one processor is coupled to at least one memory. The at least one memory is configured to store a computer program or instructions. The at least one processor is configured to invoke the computer program or instructions from the at least one memory and run the computer program or instructions, so that the communication device performs the method according to the second aspect or any possible implementation of the second aspect.

In an example, the communication apparatus may be the first node in the second aspect.

In another example, the communication apparatus may be a component (for example, a chip or an integrated circuit) installed in the first node in the second aspect.

According to an eighth aspect, the present disclosure provides a processor. The processor includes an input circuit, an output circuit, and a processing circuit. The processing circuit is configured to receive a signal through the input circuit, and transmit a signal through the output circuit, so that the method according to the first aspect or any possible implementation of the first aspect is implemented, or the method according to the third aspect or any possible implementation of the third aspect is implemented.

During a specific implementation process, the processor may be a chip. The input circuit may be an input pin. The output circuit may be an output pin. The processing circuit may be a transistor, a gate circuit, a flip-flop, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and output circuit may be a same circuit. The circuit is used as the input circuit and the output circuit at different moments. Specific implementations of the processor and the various circuits are not limited in embodiments of the present disclosure.

According to a ninth aspect, the present disclosure provides a processor. The processor includes an input circuit, an output circuit, and a processing circuit. The processing circuit is configured to receive a signal through the input circuit, and transmit a signal through the output circuit, so that the method according to the second aspect or any possible implementation of the second aspect is implemented.

During a specific implementation process, the processor may be a chip. The input circuit may be an input pin. The output circuit may be an output pin. The processing circuit may be a transistor, a gate circuit, a flip-flop, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and output circuit may be a same circuit. The circuit is used as the input circuit and the output circuit at different moments. Specific implementations of the processor and the various circuits are not limited in embodiments of the present disclosure.

According to a tenth aspect, the present disclosure provides a computer-readable storage medium. The computer-readable storage medium stores computer instructions. When the computer instructions are run on a computer, the method according to the first aspect or any possible implementation of the first aspect is performed, or the method according to the third aspect or any possible implementation of the third aspect is performed.

According to an eleventh aspect, the present disclosure provides a computer-readable storage medium. The computer-readable storage medium stores computer instructions. When the computer instructions are run on a computer, the method according to the second aspect or any possible implementation of the second aspect is performed.

According to a twelfth aspect, the present disclosure provides a computer program product. The computer program product includes computer program code. When the computer program code is run on a computer, the method according to the first aspect or any possible implementation of the first aspect is performed, or the method according to the third aspect or any possible implementation of the third aspect is performed.

According to a thirteenth aspect, the present disclosure provides a computer program product. The computer program product includes computer program code, and when the computer program code is run on a computer, the method according to the second aspect or any possible implementation of the second aspect is performed.

According to a fourteenth aspect, the present disclosure provides a chip. The chip includes a processor and a communication interface. The communication interface is configured to receive a signal and transmit the signal to the processor, and the processor processes the signal, so that the method according to the first aspect or any possible implementation of the first aspect is performed, or the method according to the third aspect or any possible implementation of the third aspect is performed.

According to a fifteenth aspect, the present disclosure provides a chip. The chip includes a processor and a communication interface. The communication interface is configured to receive a signal and transmit the signal to the processor, and the processor processes the signal, so that the method according to the second aspect or any possible implementation of the second aspect is performed.

According to a sixteenth aspect, the present disclosure provides a communication system. The communication system includes the communication device according to the sixth aspect and the communication device according to the seventh aspect.

DESCRIPTION OF EMBODIMENTS

With the development of electrification and intelligentization of vehicles, more electronic control units (ECUs) are disposed in vehicles, and mutual communication between electronic control units is more frequent. If networking is performed in a manner of point-to-point direct connection, a quantity of wiring harnesses in an in-vehicle network is multiplied, and weights and costs of vehicles are also increased. In addition, as an advanced driver assisted system (ADAS) is widely deployed in vehicles, conventional low-rate in-vehicle networks such as a Controller Area Network (CAN), a local interconnect network (LIN), and FlexRay cannot meet higher requirements of sensors in the ADAS for transmission bandwidth. The sensors include ADAS camera sensors and laser imaging, detection, and ranging (LIDAR) sensors. Therefore, it is a mainstream consensus in the industry to use Ethernet that has high bandwidth and a huge industry ecosystem as a next-generation in-vehicle network. Compared with a single-ring network topology using a port of a same rate, a ring network topology of dual-ring coupled networking can provide higher bandwidth.

The following describes technical solutions of the present disclosure with reference to accompanying drawings.

It should be understood that multi-ring coupled networking may include a plurality of sub-rings, and any two adjacent sub-rings in the plurality of sub-rings may also be summarized as dual-ring interconnected networking. Therefore, the multi-ring coupled networking is essentially a dual-ring coupled networking scenario.

The present disclosure is implemented based on the following system architecture and networking scenario. N nodes jointly form a ring network topology of dual-ring coupled networking having two sub-rings. In some embodiments, N is a positive integer greater than or equal to 4 and less than or equal to 10.

Figure 1:
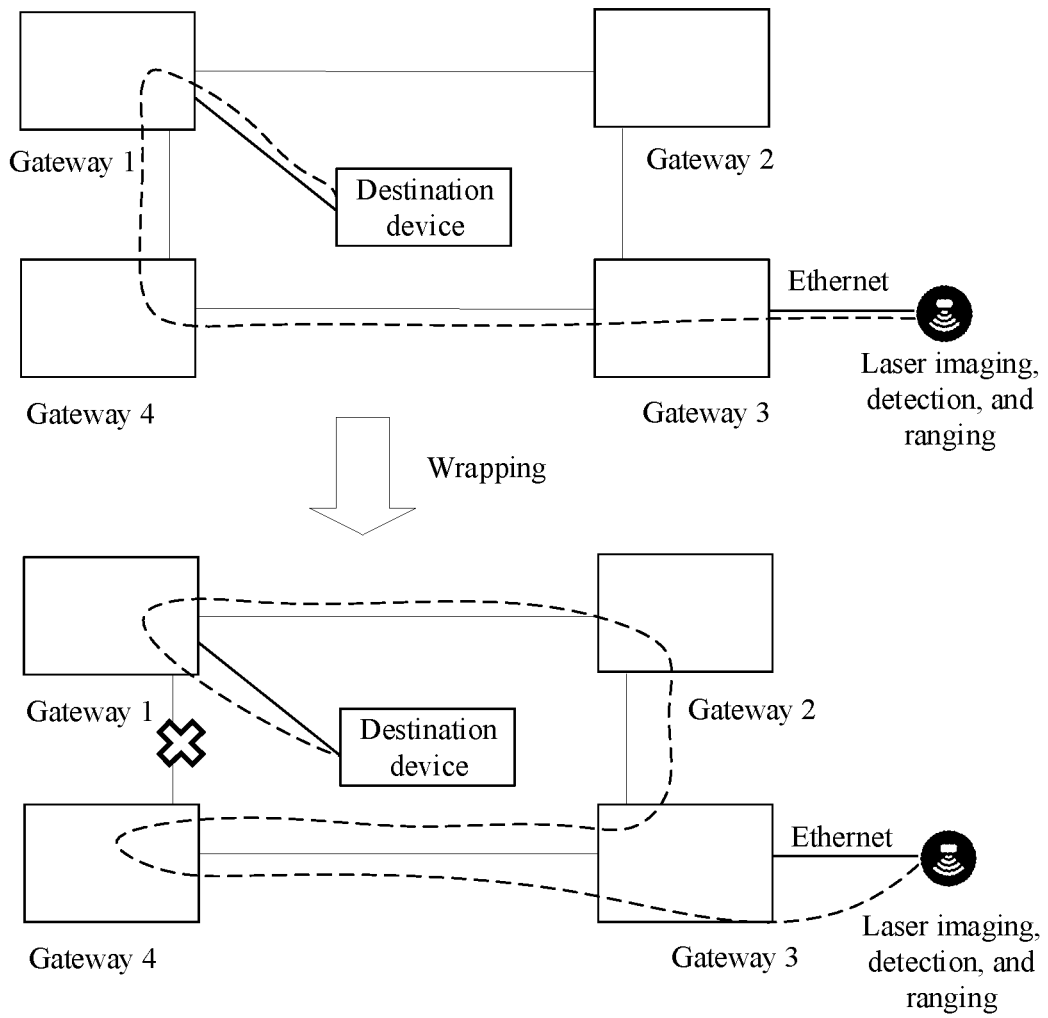
FIG. 1 is a schematic diagram of wrapping upon a single link fault in an automotive Ethernet single-ring network.
Figure 2:
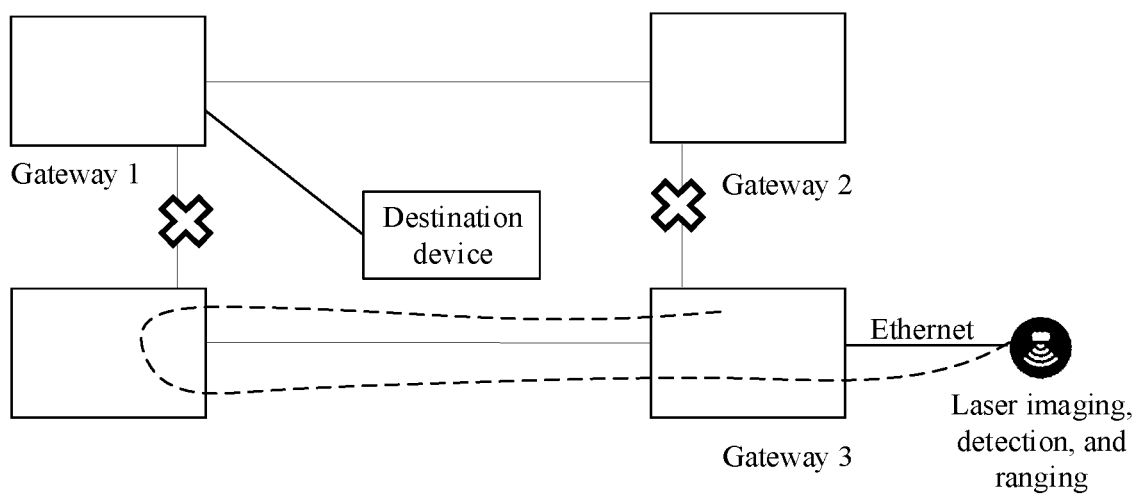
FIG. 2 is a schematic diagram of two link faults in an automotive Ethernet single-ring network.
Figure 3:
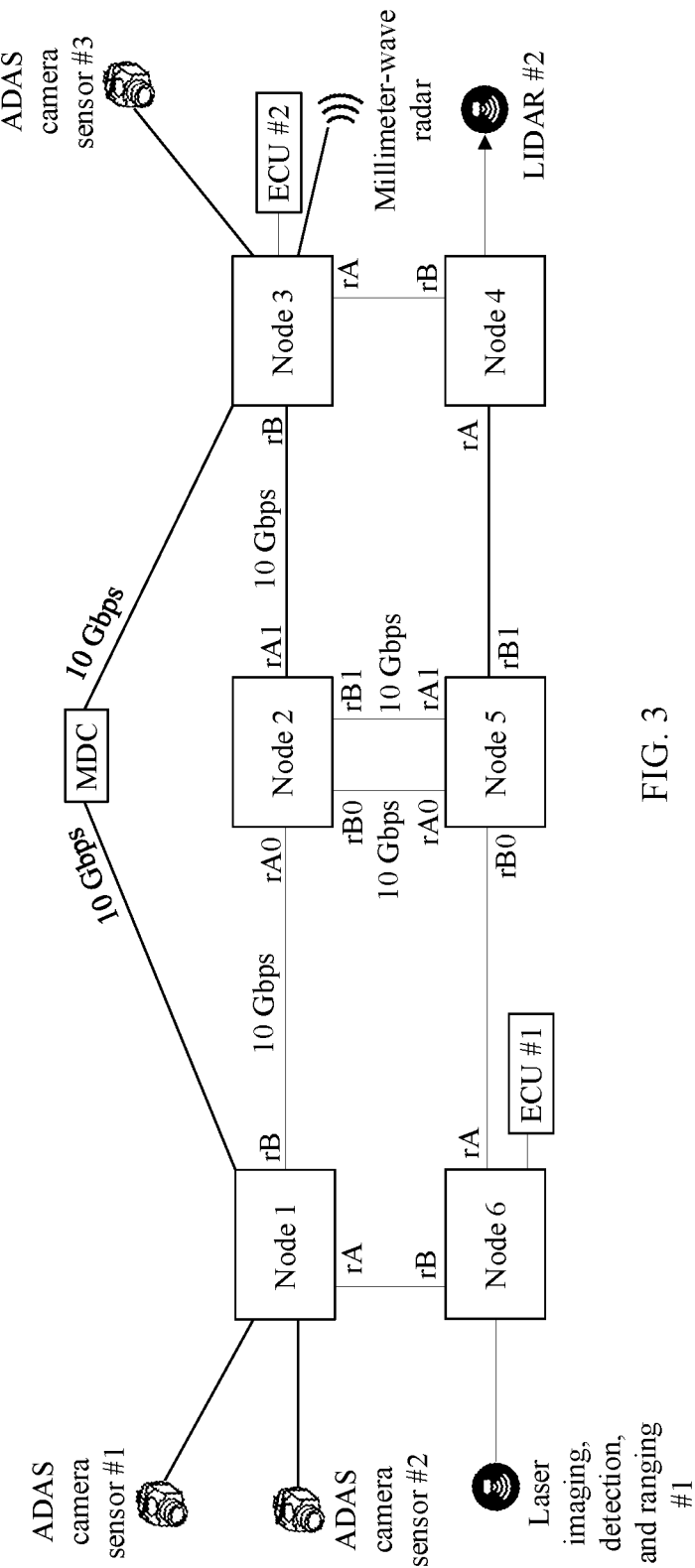
FIG. 3 is a schematic diagram of an architecture of an in-vehicle network of a ring Ethernet based on a dual-ring coupled networking topology according to the present disclosure.

FIG. 3 is a schematic diagram of an architecture of an in-vehicle network of a ring Ethernet based on a dual-ring coupled networking topology according to the present disclosure. For ease of understanding embodiments of the present disclosure, several terms used in the present disclosure are first briefly described as follows based on FIG. 3.

(1) Node: any node in the dual-ring coupled networking shown in FIG. 3. In the present disclosure, a node may be alternatively referred to as an automotive communication computing gateway, a gateway, a ring network node, or an in-vehicle network device having an Ethernet forwarding capability. This is not specifically limited in the present disclosure.

(2) Sub-ring: a minimum closed loop including at least three ring network nodes that are sequentially connected end to end. For example, a node 1, a node 2, a node 5, and a node 6 may form a sub-ring, and the node 2, a node 3, a node 4, and the node 5 may form another sub-ring.

(3) Ring number value: a different ring number value allocated to each sub-ring. For example, if a ring number value allocated to the sub-ring formed by the node 1, the node 2, the node 5, and the node 6 is 0, the corresponding sub-ring may be referred to as a sub-ring 0; and if a ring number value allocated to the sub-ring formed by the node 2, the node 3, the node 4, and the node 5 is 1, the corresponding sub-ring may be referred to as a sub-ring 1.

(4) Ring network interface: rA, rB, rA0, and rB0 in FIG. 3 schematically represent ring network interfaces connected to corresponding nodes. A ring network interface may be configured to forward a data packet in a ring network. In the present disclosure, the ring network interface may be alternatively referred to as an Ethernet interface.

A physical layer of the ring network interface may be a 10GBASE-T1 or 25GBASE-T1 physical layer interface that complies with an automotive grade. It should be understood that the ring network interface is an interface for interconnection between two nodes, and a service interface is an interface for data transmission between a node and a service data source device, an ECU device, or a mobile data center (MDC).

The 10GBASE-T1 interface may be a 10 G Ethernet automotive-grade interface in the Institute of Electrical and Electronics Engineers (IEEE) 802.3ch standard, and transmits an Ethernet signal at a rate of 10 billion bits per second (Gbps) by using a twisted pair.

The 25GBASE-T1 interface may be a 25 G Ethernet automotive grade standard being formulated by the IEEE p802.3cy task force, and transmit an Ethernet signal at a rate of 25 Gbps by using a twisted pair.

(5) Inter-ring node: If a node has ring identifiers of two or more ring network interfaces, the node is an inter-ring node. For example, the node 2 and the node 5 in FIG. 3 are inter-ring nodes.

It should be understood that FIG. 3 is merely an example diagram of a composition structure of a dual-ring coupled ring network. A quantity of inter-ring nodes in the dual-ring network is not specifically limited in the present disclosure.

(6) Data packet ring-incoming: The in-vehicle network may further include a service data source device (for example, an ADAS camera sensor, a LIDAR sensor, and a CAN bus data signal), an ECU device, and an MDC. The service data source device, the ECU device, and the MDC are connected to one node of the dual-ring coupled networking nearby based on a deployment area location. The data source device sends a data stream in a non-Ethernet format or an Ethernet format to one node. One node in each sub-ring is connected to a same MDC unit through one Ethernet interface. If a data stream received by each node from a service side is a data stream in a non-Ethernet format, a dedicated data stream format conversion unit is responsible for converting the non-Ethernet data stream into a data stream in an Ethernet format. Generally, each node receives a data packet from the service data source device, and forwards the data packet to a ring network interface in a clockwise direction or a counterclockwise direction. This may be referred to as data packet ring-incoming. FIG. 3 shows an example of an in-vehicle network scenario in which three ADAS camera sensors, two laser imaging, detection, and ranging sensors, one millimeter-wave radar, and two ECU devices are connected to the dual-ring coupled ring network.

FIG. 3 is merely a schematic diagram. The in-vehicle network may further include another data source device. For example, the in-vehicle network may further include a radar sensor, which is not shown in FIG. 3. Quantities of data source devices and ring network nodes included in the in-vehicle network are not limited in embodiments of the present disclosure.

As shown in FIG. 3, the in-vehicle network includes the node 1 to the node 6. The non-inter-ring node 1, the non-inter-ring node 3, the non-inter-ring node 4, and the non-inter-ring node 6 are respectively connected to adjacent nodes through one Ethernet interface. The inter-ring node 2 and the inter-ring node 5 are respectively connected to adjacent nodes through one or two Ethernet interfaces. Therefore, a dual-ring coupled ring network node having two sub-rings is established. For example, a sub-ring network formed by the node 1, the node 2, the node 5, and the node 6 may be referred to as a sub-ring 0, and a sub-ring network formed by the node 2, the node 3, the node 4, and the node 5 is referred to as a sub-ring 1. The node 1 (non-inter-ring node) is used as an example. The node 1 is separately connected to the node 2 and the node 6 through one Ethernet interface. The node 2 (inter-ring node) is used as an example. The node 2 is separately connected to the node 1 and the node 3 through one Ethernet interface. In addition, the node 2 is further connected to the node 5 through two Ethernet interfaces.

For example, when no fault occurs, packets in the two sub-rings in the present disclosure are transmitted in the clockwise direction.

As shown in FIG. 3, a dual-ring network can provide a bandwidth of 20 Gbps to connect to an MDC, while a single-ring network can provide only a unidirectional transmission bandwidth of 10 Gbps. If a quantity of 10 Gbps ports on a node is not increased, the dual-ring network can separately plan data traffic of all ADAS sensors to two sub-rings, and the two sub-rings send the data traffic to two 10 Gbps ports of the MDC. In this way, a transmission bandwidth capability of Gbps is achieved.

Currently, there is no solution for implementing inter-ring communication based on a multi-ring coupled ring network in an in-vehicle network. To resolve the foregoing problem, this embodiment of the present disclosure provides a data transmission method, so that inter-ring data communication becomes possible, and higher bandwidth is provided for in-vehicle communication relative to a single-ring network. For ease of description, in this embodiment of the present disclosure, a dual-ring coupled ring network scenario is used as an example for description.

Figure 4:
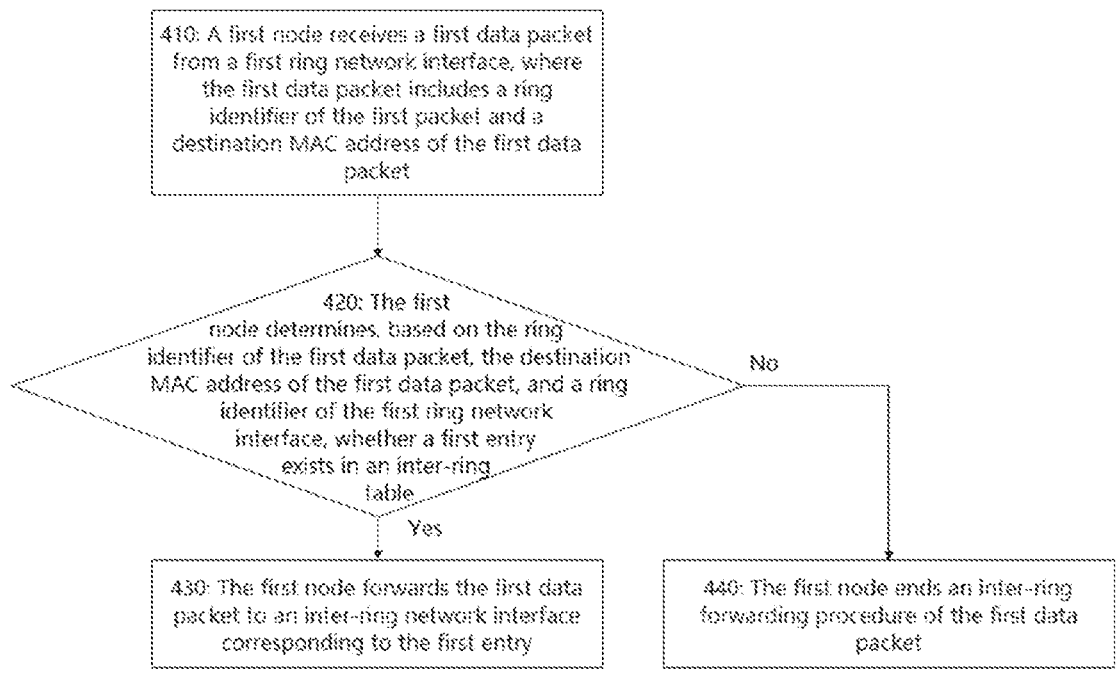
FIG. 4 is a schematic flowchart of a data transmission method according to the present disclosure.

FIG. 4 is a schematic flowchart of a data transmission method according to the present disclosure.

S410: A first node receives a first data packet from a first ring network interface.

The first node is an inter-ring node in a dual-ring coupled ring network. The first ring network interface is a ring network interface belonging to the first node. The first node is connected to a second node through the first ring network interface. The first node is connected to a third node through a second ring network interface. The second ring network interface is a ring network interface belonging to the first node. All ring network interfaces of the second node belong to a first sub-ring. All ring network interfaces of the third node belong to a second sub-ring. The first ring network interface belongs to the first sub-ring. The second ring network interface belongs to the second sub-ring. The first data packet includes a ring identifier of the first data packet and a destination MAC address of the first data packet. The ring identifier of the first data packet is a ring number value of the first sub-ring.

It should be understood that the dual-ring coupled ring network is used as an example for description in the present disclosure. In a multi-ring coupled ring network, the ring identifier of the first data packet may be a ring number value of the first sub-ring or any sub-ring through which the first data packet passes in the multi-ring coupled ring network before the first data packet is transmitted to the first sub-ring. For descriptions that the ring identifier of the first data packet is specifically a ring number value of a specific sub-ring in the multi-ring coupled ring network, refer to descriptions in an embodiment in FIG. 5. Details are not described herein.

The dual-ring coupled ring network shown in FIG. 3 is used as an example. The ring number value of the sub-ring 0 is 0, and the ring number value of the sub-ring 1 is 1. If the first node (namely, the inter-ring node) is the node 2 in FIG. 3, the first ring network interface is the interface rA0 of the node 2, the second ring network interface is the interface rB0 of the node 2, the second node is the node 1, and the third node is the node 3. The node 2 is connected to the node 1 through the interface rA0. The node 2 is connected to the node 3 through the interface rB0. All ring network interfaces of the node 1 belong to the sub-ring 0. All ring network interfaces of the node 3 belong to the sub-ring 1.

S420: The first node determines, based on the ring identifier of the first data packet, the destination MAC address of the first data packet, and a ring identifier of the first ring network interface, whether a first entry exists in an inter-ring table.

A ring identifier of each ring network interface in the dual-ring coupled ring network is a ring number value corresponding to a sub-ring to which the ring network interface belongs. The inter-ring table includes a plurality of entries. Each entry includes a correspondence between each of a ring identifier of a ring network interface for receiving a packet by the first node, a packet ring identifier, and a MAC address and an inter-ring network interface. A ring identifier of the inter-ring network interface in each entry is different from the ring identifier of the ring network interface for receiving the packet by the first node.

It should be noted that, the inter-ring table is preconfigured for different inter-ring nodes. Inter-ring tables for different inter-ring nodes are different. The inter-ring table matches only a data packet received by an inter-ring node on a ring network interface. The inter-ring network interface of the first node in the inter-ring table is also a ring network interface belonging to the first node.

For example, an inter-ring table of the node 2 is shown in Table 1. Each entry includes: a ring identifier of a ring network interface for receiving a packet by the node 2, a packet ring identifier, a MAC address, and an inter-ring network interface (namely, an egress ring network interface). The node 2 serves as an inter-ring node and has a plurality of ring network interfaces, so that a ring identifier of an ingress ring network interface in Table 1 may be 0 or 1. However, an ingress ring network interface and an egress ring network interface in each entry are ring network interfaces of different sub-rings (in other words, ring identifiers of the ring network interfaces are different). It can be learned that, in a first entry in Table 1, the ring identifier of the ingress ring network interface is 0, and the ring identifier of the egress ring network interface rA1 is 1. In a second entry, the ring identifier of the ingress ring network interface is 1, and the ring identifier of the egress ring network interface rA0 is 0.

TABLE 1

| Ring identifier of a ring network interface for receiving a packet | Packet ring identifier | MAC address | Inter-ring network interface (Egress ring network interface) |
|---|---|---|---|
| 0 | 0 | d8:49:0b:c9:d9:d7 | rA1 |
| 1 | 1 | d8:49:0b:c9:d9:d8 | rA0 |
| ... | ... | ... | ... |

If the first entry exists, skip to S430. If the first entry does not exist, skip to S440.

S430: If the first entry exists, the first node forwards the first data packet to an inter-ring network interface corresponding to the first entry.

A ring identifier of a ring network interface used by the first node to receive a packet in the first entry is the same as the ring identifier of the first ring network interface. A packet ring identifier in the first entry is the same as the ring identifier of the first data packet. A MAC address in the first entry is the same as the destination MAC address of the first data packet.

In this way, the first data packet is forwarded from a sub-ring on which the first ring network interface is located to a sub-ring on which the inter-ring network interface is located. However, the ring identifier carried in the first data packet during the inter-ring forwarding remains unchanged.

S440: If the first entry does not exist, the first node ends an inter-ring forwarding procedure of the first data packet.

In the foregoing solution, a dual-ring coupled topology is allowed to be used to construct an in-vehicle network. An inter-ring forwarding trustlist table is introduced on an inter-ring node, and the table is used to control enabling of inter-ring communication of specific traffic. The inter-ring forwarding trustlist table is used to match only traffic received by the ring network interface of the inter-ring node, so that inter-ring data communication becomes possible, and higher backbone bandwidth and physical traffic isolation can be provided for the in-vehicle network.

In addition, it can be learned from the foregoing descriptions that only a case in which a single link fault occurs in an automotive Ethernet single-ring network is considered, and a case in which a two-point link fault occurs in an automotive Ethernet dual-ring coupled ring network is not supported.

A link may be a link between two connected nodes in a ring network. The single link fault may be a fault that occurs at a single physical location point on a link between two connected nodes. In some other embodiments, the single link fault may be a link fault that is between two connected nodes and that is caused by a fault of either of the two connected nodes.

In some embodiments, a node may periodically send a connectivity detection packet to a node connected to the node. If a connectivity detection response packet is received within preset duration, it indicates that a link between the two connected nodes is normal. If no connectivity detection response packet is received within the preset duration, it indicates that the link between the two connected nodes is faulty. The periodicity may be 1 millisecond, 300 microseconds, or the like.

To resolve the foregoing problem, an embodiment of the present disclosure provides a data transmission method. Two sub-rings in a dual-ring coupled ring network can resist a single link fault that occurs in each sub-ring, to further improve reliability of data transmission.

Figure 5:
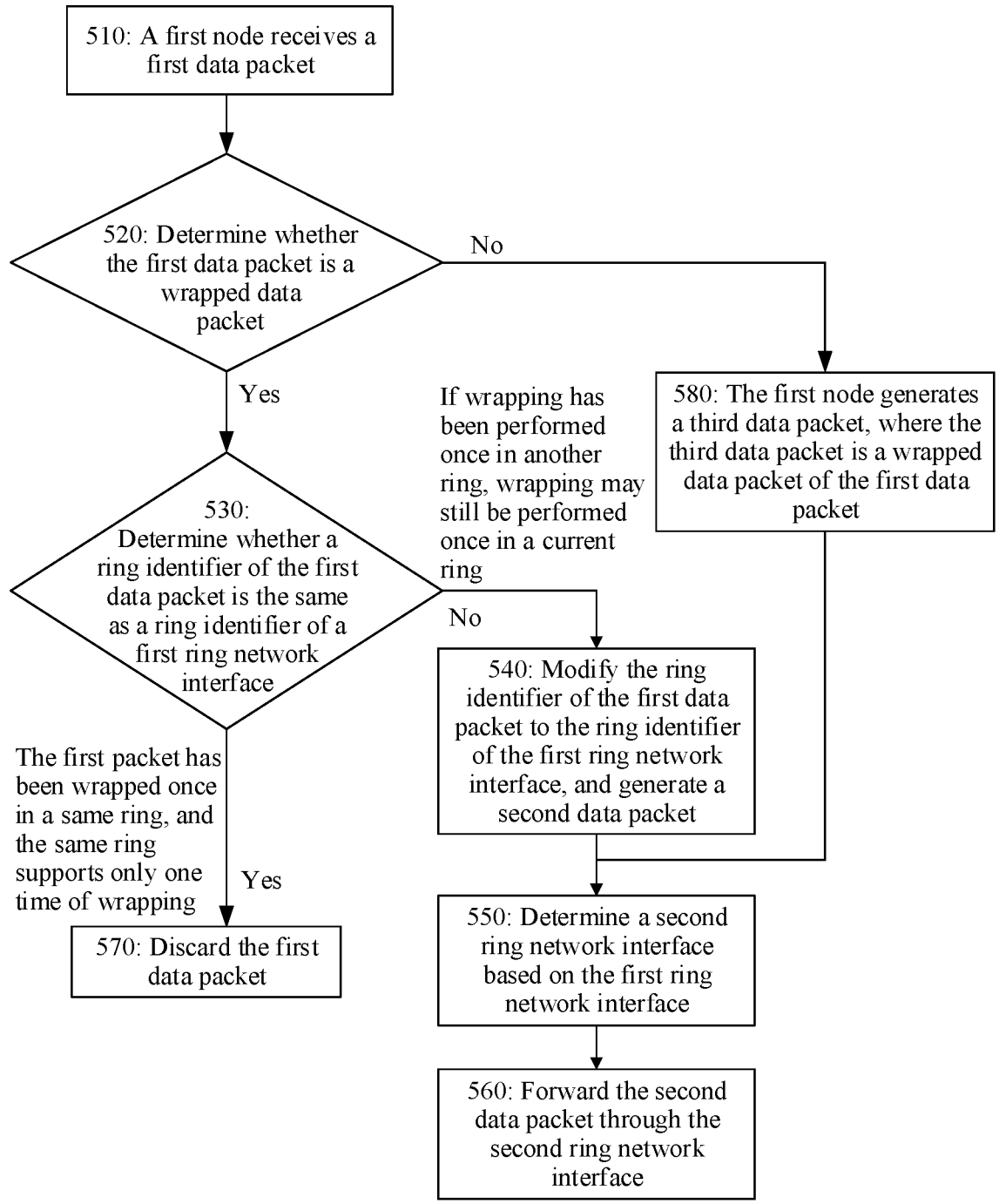
FIG. 5 is a schematic flowchart of a data transmission method according to the present disclosure.

FIG. 5 is a schematic flowchart of a data transmission method according to the present disclosure.

S510: A first node receives a first data packet.

The first node is a node in a dual-ring coupled ring network. The first data packet includes a ring identifier and a wrapping identifier of the first data packet. The ring identifier of the first data packet is a ring number value corresponding to a first sub-ring or a second sub-ring. The wrapping identifier indicates that the first data packet is a wrapped data packet or a non-wrapped data packet.

Wrapping may mean reversal and loopback of data transmission on a specified interface of a node adjacent to a fault in a ring network topology. In other words, all data reaching the interface is steered, and then transmitted in the ring network in a direction entirely opposite to an original transmission direction, to avoid a faulty node or a faulty link.

In some embodiments, the first node includes a first service interface. The first node may receive the first data packet through the first service interface. For example, the first node is connected to an ADAS camera sensor through the first service interface. The ADAS camera sensor collects surrounding environment information of a vehicle and transmits the surrounding environment information of the vehicle to a mobile data center. The first node may receive, through the first service interface, the first data packet sent by the ADAS camera sensor.

An Ethernet frame provided in this embodiment of the present disclosure is compatible with a standard Ethernet frame format, so that costs and technical complexity of an in-vehicle network can be reduced. In some embodiments, the first data packet that is sent by the ADAS camera sensor and that is received by the first node may be an Ethernet frame format defined in IEEE 802.3.

Figure 6:
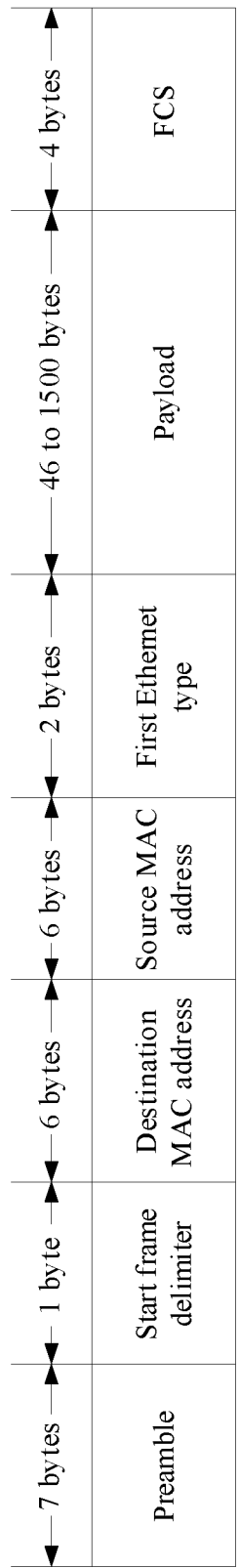
FIG. 6 is an example diagram of a structure of an Ethernet frame according to a conventional technology.

FIG. 6 is an example diagram of a structure of an Ethernet frame according to a conventional technology. The Ethernet frame includes a preamble field, a start frame delimiter field, a destination MAC address field, a source MAC address field, a first Ethernet type field, a payload field, and a frame check sequence (FCS) field. The destination MAC address field is used to carry a destination MAC address. The source MAC address field is used to carry a source MAC address. The first Ethernet type field is used to carry an Ethernet type. The payload field is used to carry data. The FCS field is used to carry a check code, for example, a cyclic redundancy check (CRC) code.

In some embodiments, after the first node receives the first data packet sent by the ADAS camera sensor, the first node may extend the first data packet. An Ethernet frame format of the extended first data packet is still an Ethernet frame format in IEEE 802.1cb. A ring identifier field and a wrapping field may be added to the Ethernet frame format in IEEE 802.1cb.

A value of a ring identifier field of the extended first data packet is the ring identifier of the first data packet. For example, when the first node receives the first data packet sent by the ADAS camera sensor, and the first node forwards the first data packet to a first ring network interface for forwarding, if a ring identifier of the first ring network interface is 0, the value of the ring identifier field in the first data packet is 0.

A value of a wrapping field in the extended first data packet is the wrapping identifier of the first data packet. When the value of the wrapping field is a first value, it indicates that a data packet including the wrapping field is a non-wrapped data packet. When the value of the wrapping field is a second value, it indicates that a data packet including the wrapping field is a wrapped data packet. In this way, another node in a dual-ring coupled ring network may identify, based on the wrapping field, whether a received data packet is a wrapped data packet.

In a possible design, when the value of the wrapping field is 0, it indicates that a data packet including the wrapping field is a non-wrapped data packet. When the value of the wrapping field is 1, it indicates that a data packet including the wrapping field is a wrapped data packet, and vice versa.

Figure 7:
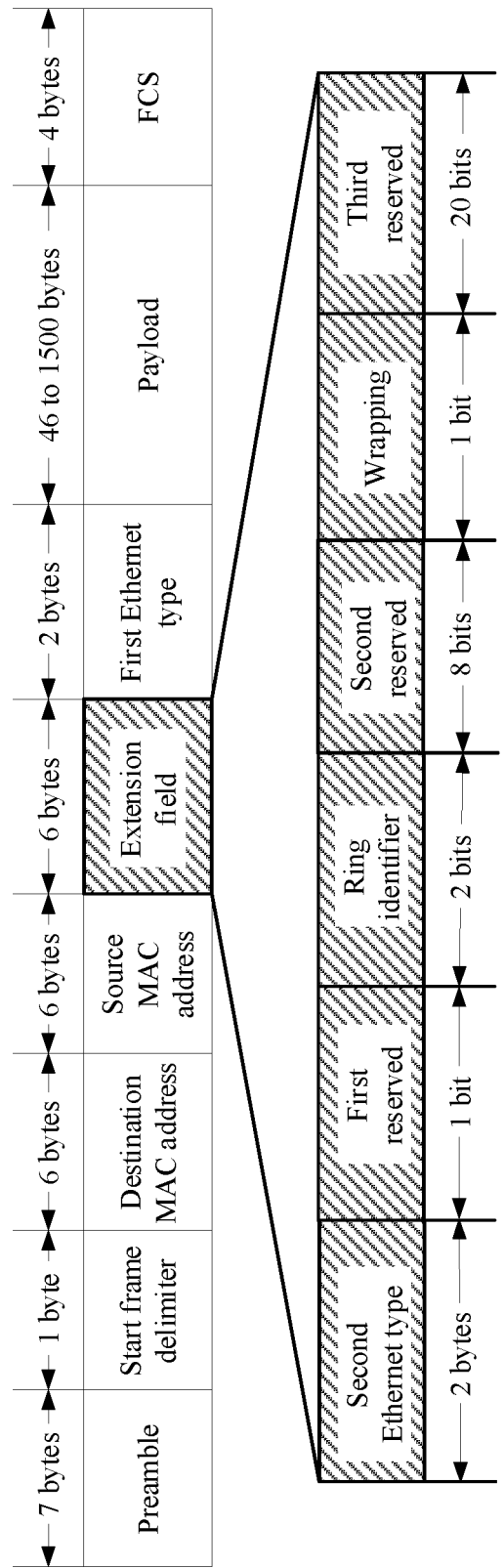
FIG. 7 is an example diagram of a structure of an Ethernet frame according to an embodiment of the present disclosure.

FIG. 7 is an example diagram of a structure of an Ethernet frame according to an embodiment of the present disclosure. Based on FIG. 6, six-byte extension fields are added to the Ethernet frame. A second Ethernet type field, a first reserved field, a ring identifier field, a second reserved field, a wrapping field, and a third reserved field are extension fields of the Ethernet frame. A length of the second Ethernet type field is two bytes. A length of the first reserved field is one bit. A length of the ring identifier field is two bits. A length of the second reserved field is eight bits. A length of the wrapping field is one bit. A length of the third reserved field is 20 bits.

In some embodiments, a value of the second Ethernet type field may be a value of an unused Ethernet type field, for example, 0xF1C1.

S520: The first node determines to send the first data packet to a second node on the first ring network interface, and the first node detects, on the first ring network interface, that a fault exists on a link between the first node and the second node, and determines whether the first data packet is a wrapped data packet.

The first ring network interface is a ring network interface belonging to the first node. The first node is connected to the second node through the first ring network interface.

When the first node determines, based on the wrapping identifier in the first data packet, that the first data packet is a wrapped data packet, skip to S530; or when the first node determines, based on the wrapping identifier in the first data packet, that the first data packet is a non-wrapped data packet, skip to S580.

S530: When the first data packet is a wrapped data packet, continue to determine whether the ring identifier of the first data packet is the same as the ring identifier of the first ring network interface. A ring identifier of each ring network interface in the dual-ring coupled ring network is a ring number value corresponding to a sub-ring to which the ring network interface belongs.

When the ring identifier of the first data packet is different from the ring identifier of the first ring network interface, skip to S540; or when the ring identifier of the first data packet is the same as the ring identifier of the first ring network interface, skip to S570.

S540: When the ring identifier of the first data packet is different from the ring identifier of the first ring network interface, the first node modifies the ring identifier of the first data packet to the ring identifier of the first ring network interface, and generates a second data packet.

When the first data packet is a wrapped data packet, it indicates that wrapping has been performed on the first data packet. However, the ring identifier of the first data packet is different from the ring identifier of the first ring network interface, and it indicates that wrapping has not been performed on the first data packet on the sub-ring on which the first ring network interface is located. Therefore, wrapping may still be sequentially performed on the first data packet on the first ring network interface.

S550: The first node determines a second ring network interface based on the first ring network interface.

The second ring network interface is a ring network interface that belongs to the first node and that has a same ring identifier as that of the first ring network interface.

In some embodiments, the first ring network interface controls a sending unit of the first ring network interface to be connected to a receiving unit of the first ring network interface, and it indicates that port-level loopback is performed on the first ring network interface. In other words, the first ring network interface is converted from an interface for sending the first data packet to an interface for receiving the first data packet. A loopback occurrence point may be located on a media independent interface (MII) at a MAC layer of the first ring network interface. A 10 G ring network interface is used as an example. A sending unit and a receiving unit on a same interface are connected. 32 data sending lines (such as TXD<0>, TXD<1>, . . . , TXD<31>) on an XG MII (such as a 10 G MII) at a MAC layer of the 10 G interface may be connected to 32 corresponding data receiving lines (such as RXD<0>, RXD<1>, . . . , RXD<31>). Four control signal sending lines (such as TXC<0>, TXC<1>, TXC<2>, TXC<3>) are connected to four corresponding control signal receiving lines (such as RXC<0>, RXC<1>, RXC<2>, RXC<3>).

The first node may query a ring network forwarding table based on the first ring network interface, to determine the second ring network interface that is of the first node and that corresponds to the first ring network interface. The ring network forwarding table indicates a correspondence between an ingress interface and an egress interface. The ingress interface indicates an interface that receives a data packet. The ingress interface is a ring network interface or a service interface. The egress interface indicates an interface that forwards a data packet in the ring network. In the present disclosure, the ring network forwarding table is used to forward a ring-incoming data packet and a data packet transited through the ring network. Entries in the ring network forwarding table may be statically configured.

It should be noted that a sequence of steps in the data transmission method provided in this embodiment of the present disclosure may be properly adjusted, or steps may be correspondingly increased or decreased based on a situation. For example, a sequence of S540 and S550 may be interchanged. In other words, the second ring network interface may be first determined based on the first ring network interface, and then the second data packet is generated. Any method variation readily figured out by a person skilled in the art within the technical scope disclosed in the present disclosure shall fall within the protection scope of the present disclosure. Therefore, details are not described herein again.

S560: The first node forwards the second data packet through the second ring network interface.

S570: When the ring identifier of the first data packet is the same as the ring identifier of the first ring network interface, the first node discards the first data packet.

When the ring identifier of the first data packet is the same as the ring identifier of the first ring network interface, and the first data packet is a wrapped data packet, it indicates that wrapping has been performed once on the first data packet in an inner ring of the sub-ring on which the first ring network interface is located. A same sub-ring supports only one time of wrapping. In this case, to avoid a broadcast storm, the first data packet needs to be discarded.

S580: When the first data packet is a non-wrapped data packet, the first node generates a third data packet. Then, S550 and S560 are performed.

In some embodiments, the first data packet includes a wrapping field, and a value of the wrapping field is set to the second value, to obtain the third data packet. The third data packet may be understood as a wrapped data packet of the first data packet.

In addition, the present disclosure further proposes a data transmission method. A difference from the foregoing solution lies in that a first data packet may carry a first wrapping identifier and a second wrapping identifier. The first wrapping identifier indicates that the first data packet is a wrapped data packet or a non-wrapped data packet on a first sub-ring. The second wrapping identifier indicates whether the first data packet is a wrapped data packet or a non-wrapped data packet on a second sub-ring and whether the first data packet undergoes one time of wrapping in the second ring network. In the present disclosure, that the first data packet is a wrapped data packet or a non-wrapped data packet on a corresponding sub-ring may be understood as whether the first data packet undergoes one time of wrapping on a corresponding sub-ring. For example, the first data packet carries 2-bit information 00. The first 0 (namely, an example of the first wrapping identifier) indicates that the first data packet has not undergone one time of wrapping on the first sub-ring. The second 0 (namely, an example of the second wrapping identifier) indicates that the first data packet has not undergone one time of wrapping on the second sub-ring. When a single link fault occurs in a transmission process of the first data packet on the first sub-ring, the first data packet changes from 00 to 10 after undergoing one time of wrapping on a sub-ring 0. In this case, the first 1 indicates that the first data packet has undergone one time of wrapping on the first sub-ring. The second 0 indicates that the first data packet has not undergone one time of wrapping on the second sub-ring. When the first data packet is transmitted across the ring to the second sub-ring, and a single link fault occurs again in a transmission process of the first data packet on the second sub-ring, the first data packet changes from 10 to 11 after undergoing one time of wrapping on the second sub-ring. In this case, the first 1 indicates that the first data packet has undergone one time of wrapping on the first sub-ring. The second 1 indicates that the first data packet has also undergone one time of wrapping on the second sub-ring. If a link fault occurs again on the second sub-ring in subsequent transmission, it can be learned from the wrapping identifier 11 carried in the first data packet that the first data packet has undergone one time of wrapping. In this case, the first data packet needs to be discarded. This is extended to a multi-ring coupled ring network, for example, in a four-ring coupled ring network, the first data packet needs to carry 4-bit information (in other words, each of the four sub-rings corresponds to one wrapping identifier) to indicate whether the first data packet undergoes one time of wrapping when passing through each sub-ring. The process of wrapping transmission of the packet is the same as the process in the foregoing embodiment. Details are not described herein again.

According to the data transmission method provided in this embodiment of the present disclosure, a single fault on each of the two sub-ring networks can be resisted, and a data stream undergoes one time of wrapping at most on each sub-ring. This makes full use of an advantage of a dual-ring physical topology, and improves reliability of data transmission in an in-vehicle network based on a ring Ethernet. In addition, this solution is extended based on a wrapping mechanism of a single ring, is compatible with a single-ring topology in-vehicle network of an existing in-vehicle ring network, and is easy to deploy and implement by using a hardware chip.

Figure 8:
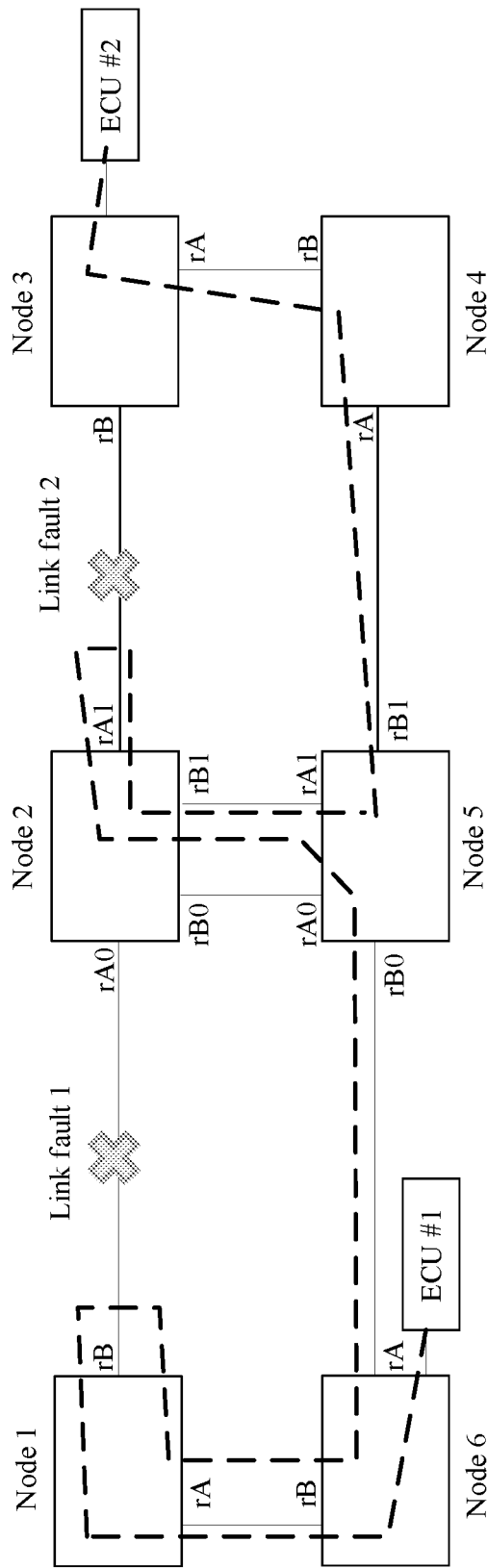
FIG. 8 is a schematic diagram of a transmission path on which a data packet #1 sent by an electronic control unit (ECU) #1 to an ECU #2 in a dual-ring coupled ring network arrives at the ECU #2 after two times of wrapping on two sub-rings.

For ease of understanding, the following describes in detail an implementation process of inter-ring communication and packet wrapping transmission by using an example in which a data packet #1 is sent by an ECU #1 to an ECU #2 in a dual-ring coupled ring network shown in FIG. 8.

Step 1: A ring number value is allocated to each sub-ring in dual-ring coupled networking, and a ring identifier is allocated to each ring network interface of each node. The ring identifier of each ring network interface is a ring number value of a sub-ring to which the ring network interface belongs.

It should be understood that the ring identifier of the ring network interface is related only to the ring number value of the sub-ring to which the ring network interface belongs, and is not related to a clockwise or counterclockwise transmission direction of a data packet (data frame) in each sub-ring.

As an example, a ring number value 0 is allocated to a sub-ring formed by a node 1, a node 2, a node 5, and a node 6, and a ring number value 1 is allocated to a sub-ring formed by the node 2, a node 3, a node 4, and the node 5. In this case, a ring identifier of a ring network interface of each node on the sub-ring 0 is 0, and a ring identifier of a ring network interface of each node on the ring network 1 is 1. For example, a ring identifier of a ring network interface rA of the node 1 is 0, and a ring identifier of a ring network interface rB of the node 1 is 1; and ring identifiers of a ring network interface rA0 and a ring network interface rB0 of the node 2 are 0, and ring identifiers of a ring network interface rA1 and a ring network interface rB1 of the node 2 are 1. Examples are not provided one by one herein for ring identifiers of ring network interfaces of other nodes.

Step 2: When the ECU #1 needs to send the packet #1 to the ECU #2, the data packet #1 of the ECU #1 enters the sub-ring 0 through the node 6.

As an example, the packet #1 received by the node 1 may be in an Ethernet frame format defined in IEEE 802.3. After the node 6 receives the data packet #1, the node 6 may extend the data packet #1, to extend the Ethernet frame format defined in IEEE 802.3.

For ease of description, this embodiment is described by using an extended Ethernet frame structure shown in FIG. 5 as an example. When the node 6 forwards, along a clockwise transmission direction, the data packet #1 to an interface rB of the node 6 for forwarding, because a ring identifier of the interface rB of the node 6 is 0, a value of a ring identifier field in the data packet #1 is 00. Because the data packet #1 has not been wrapped, a value of a wrapping field in the data packet #1 is 0. A destination MAC address in the data packet #1 is a MAC address of the ECU #2.

Step 3: The node 6 forwards the data packet #1 to the node 1 according to a forwarding rule of an in-vehicle ring network.

Step 4: As shown in FIG. 8, a link fault 1 exists. The node 1 detects, on the interface rB of the node 1, that a link fault occurs between the node 1 and the node 2. In other words, the link between the node 1 and the node 2 is interrupted. For the data packet #1 forwarded to the interface rA of the node 1, whether to perform wrapping on the data packet #1 or discard the data packet #1 is determined based on the data transmission procedure in FIG. 5. For a specific determining process, refer to S710 to S730.

710: No link fault occurs previously in the ring network, and the wrapping field in the data packet #1 is 0, so that the data packet #1 is a non-wrapped data packet.

720: The node 1 sets the wrapping field in the data packet #1 to 1, to indicate that the data packet #1 is a wrapped data packet. In this case, the value of the ring identifier field in the data packet #1 is still 00, and the value of the wrapping field in the data packet #1 is changed to 1.

730: The node 1 performs port-level loopback on the data packet #1 on the interface rB of the node 1. In other words, it indicates that the data packet #1 is transmitted on the interface rB in a direction entirely opposite to an original transmission direction. Then, the node 1 forwards, according to the forwarding rule of the in-vehicle ring network, the loopback data packet #1 to the ring network interface rA of the node 1 that has a same ring identifier (where the ring identifier is 0) as the interface rB of the node 1.

Step 5: The packet wrapped by the node 1 returns to the node 6, and the node 6, as a non-inter-ring node, forwards the data packet #1 to a ring network interface rB0 of the node 5 according to the forwarding rule of the in-vehicle ring network.

Step 6: The node 5 of the inter-ring device receives the data packet #1 on the ring network interface rB0 of the node 5, and the node 5 forwards the data packet #1 to a ring network interface rA1 of the node 5 according to the forwarding rule of the in-vehicle ring network. Then, a ring identifier of the ring network interface rB0 of the node 5, a ring identifier of the data packet #1, and a destination MAC address of the data packet #1 are used as key values to query a preconfigured inter-ring table corresponding to the node 5.

For example, the inter-ring table of the node 5 is shown in Table 2. For meanings of parameters in the inter-ring table, refer to descriptions in Table 1. Details are not described herein again.

TABLE 2

| Ring identifier of a ring network interface for receiving a packet | Packet ring identifier | MAC address | Inter-ring network interface (Egress ring network interface) |
|---|---|---|---|
| 0 | 0 | d8:49:0b:c9:d9:d7 | rA1 |
| 1 | 1 | d8:49:0b:c9:d9:d8 | rA0 |
| ... | ... | ... | ... |

It should be understood that Table 1 and Table 2 are merely examples for describing the inter-ring tables configured for the node 2 and the node 5. In actual application, Table 1 and Table 2 need to be configured based on actual conditions of the node 2 and the node 5.

It is assumed that the ring identifier of the ring network interface rB0, the ring identifier of the data packet #1, and the destination MAC address of the data packet #1 match a first entry in Table 2. In other words, the ring identifier of the ring network interface rB0 of the node 5 (where the ring identifier is 0) is the same as a ring identifier 0 of a ring network interface for receiving a packet in the first entry, the ring identifier of the data packet #1 is the same as a packet ring identifier 0 in the first entry, and the destination MAC address of the data packet #1 is the same as a MAC address d8:49:0b:c9:d9:d7 in the first entry. Therefore, based on a query result, the node 5 copies the data packet #1, and then forwards the copied data packet #1 to an inter-ring network interface rA1 corresponding to the first entry. It should be understood that the egress ring network interface rA1 herein indicates an interface rA1 connected to the node 5.

In this way, the data packet #1 generated by the ring network 0 is forwarded to the sub-ring 1. However, the data packet #1 still reserves the ring identifier of the source ring network (sub-ring 0) and the current value of the wrapping field. In other words, the value of the ring identifier field in the data packet #1 after inter-ring is still 00, and the value of the wrapping field is still 1.

Step 7: The node 2 of the inter-ring device receives the data packet #1 on the ring network interface rB1 of the node 2, and the node 2 forwards the data packet #1 to the ring network interface rA1 of the node 2 according to the forwarding rule of the in-vehicle ring network. Then, the same as the inter-ring procedure of the node 5 described in step 6, the node 2 uses a ring identifier of the ring network interface rB1 of the node 2 (where the ring identifier is 1), the ring identifier of the data packet #1 (where the ring identifier is 0), and the destination MAC address of the data packet #1 as key values to query the inter-ring table that is of the node 2 and that is shown in Table 1. The inter-ring table of the node 2 is preconfigured, so that no matching is found in this case. In this case, the inter-ring forwarding procedure of the node 2 ends. In other words, it indicates that the data packet #1 cannot be transmitted across rings from the current sub-ring 1 to the sub-ring 0.

Step 8: As shown in FIG. 7, a link fault 2 exists: The node 2 detects, on the interface rA1 of the node 2, that a link fault occurs between the node 2 and the node 3. In other words, a link between the node 2 and the node 3 is interrupted. For the packet #1 forwarded to the interface rA1 of the node 2, whether to perform wrapping on the data packet #1 or discard the data packet #1 is determined based on the data transmission procedure in FIG. 5. For a specific determining process, refer to S810 to S830.

810: It can be learned from the foregoing description that the wrapping field in the current data packet #1 is already 1. It indicates that the data packet #1 is a wrapped data packet.

820: The ring identifier 0 of the data packet #1 is different from the ring identifier 1 of the interface rA1 of the node 2. The node 2 sets a value of the ring identifier field in the data packet #1 to the ring identifier 1 of the interface rA1 of the node 2. In this case, the value of the ring identifier field in the data packet #1 is changed to 01, and the value of the wrapping field in the data packet #1 is still 1.

830: The node 2 performs, on the interface rA1 of the node 2, port-level loopback again on the data packet #1 that has undergone one time of wrapping on the sub-ring 0. In other words, it indicates that the data packet #1 is transmitted in a direction entirely opposite to the original transmission direction on the interface rA1 of the node 2. Then, the node 2 forwards, according to the forwarding rule of the in-vehicle ring network, the loopback data packet #1 to another ring network interface rB1 that is of the node 2 and that has a same ring identifier (where the ring identifier is 1) as the interface rA1 of the node 2.

Step 9: The data packet #1 wrapped by the node 2 returns to the node 5, and the node as an inter-ring node, receives the data packet #1 on the ring network interface rA1, and forwards the data packet #1 to a ring network interface rB1 of the node 5 according to the forwarding rule of the in-vehicle ring network.

Subsequently, the ring identifier of the ring network interface rA1 of the node 5 (where the ring identifier is 1), the ring identifier of the data packet #1 (where the ring identifier is 1), and the destination MAC address of the data packet #1 are used as key values to query the inter-ring table shown in Table 2. No matching is found, and the inter-ring forwarding procedure of the node 5 ends.

Step 10: The node 4 receives the data packet #1 on a ring network interface rA of the node 4, and the node 4, as a non-inter-ring node device, forwards the packet #1 to a ring network interface rB of the node 4 according to the forwarding rule of the in-vehicle ring network.

Step 11: The node 3 receives the packet #1 on a ring network interface rA of the node 3, and the node 3, as a non-inter-ring node device, forwards the data packet #1 to an ECU #2 device according to the forwarding rule of the in-vehicle ring network.

At this point, the inter-ring communication forwarding procedure in which two times of packet wrapping occur on two sub-rings ends, and a complete transmission path is shown by a dashed line in FIG. 8.

The data transmission method provided in the present disclosure is described in detail above, and the following describes a communication apparatus provided in the present disclosure.

Figure 9:
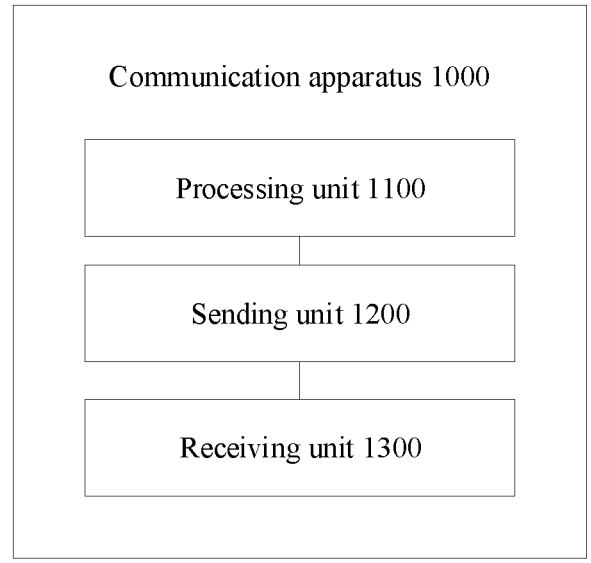
FIG. 9 is a schematic block diagram of a communication apparatus 1000 according to the present disclosure.

FIG. 9 is a schematic block diagram of a communication apparatus 1000 according to the present disclosure. The communication apparatus is applied to a first node in a multi-ring coupled ring network. The multi-ring coupled ring network includes a plurality of sub-rings. As shown in FIG. 9, the communication apparatus 1000 includes a receiving unit 1100, a processing unit 1200, and a sending unit 1300.

The receiving unit 1100 is configured to receive a first data packet. The first data packet includes a ring identifier and a wrapping identifier of the first data packet. The ring identifier of the first data packet is a ring number value of any sub-ring in the multi-ring coupled ring network through which the first data packet is transmitted. The wrapping identifier indicates that the first data packet is a wrapped data packet or a non-wrapped data packet. The processing unit 1200 is configured to, when the first node detects, on a first ring network interface, that a fault exists on a link between the first node and a second node, and the first data packet is a wrapped data packet, if the ring identifier of the first data packet is different from a ring identifier of the first ring network interface, generate a second data packet. The second data packet is a packet generated after the ring identifier of the first data packet is set to the ring identifier of the first ring network interface. The first ring network interface is a ring network interface belonging to the first node. The first node is connected to the second node through the first ring network interface. The first ring network interface is an interface through which the first node sends the first data packet. A ring identifier of each ring network interface in the multi-ring coupled ring network is a ring number value of a sub-ring to which the ring network interface belongs. The processing unit 1200 is further configured to determine a second ring network interface based on the first ring network interface. The second ring network interface is a ring network interface that belongs to the first node and that has a same ring identifier as that of the first ring network interface. The sending unit 1300 is configured to forward the second data packet through the second ring network interface.

Optionally, in an embodiment, the processing unit 1200 is further configured to discard the first data packet when the ring identifier of the first data packet is the same as the ring identifier of the first ring network interface.

Optionally, in an embodiment, when the wrapping identifier is a first value, the wrapping identifier indicates that the first data packet is a non-wrapped data packet. When the wrapping identifier is a second value, the wrapping identifier indicates that the first data packet is a wrapped data packet. The processing unit 1200 is further configured to, when the first node detects, on the first ring network interface, that a fault exists on a link between the first node and the second node, and the first data packet is a non-wrapped data packet, generate a third data packet. The third data packet is a packet generated after the wrapping identifier of the first data packet is set to the second value. The sending unit 1300 forwards the third data packet through the second ring network interface.

Optionally, in an embodiment, the processing unit 1200 is specifically configured to: query a ring network table based on the first ring network interface, and determine the second ring network interface corresponding to the first ring network interface. The ring network table indicates a correspondence between an ingress interface and an egress interface. The ingress interface indicates an interface that receives a data packet, and the ingress interface is a ring network interface or a service interface. The egress interface indicates a ring network interface that forwards a data packet in the multi-ring coupled ring network.

In some other solutions, the communication apparatus 1000 is applied to a first node in a dual-ring or multi-ring coupled ring network. The dual-ring or multi-ring coupled ring network includes a first sub-ring and a second sub-ring that are adjacent to each other. Units of the communication apparatus 1000 are further configured to perform the following steps and/or operations.

The receiving unit 1100 is configured to receive a first data packet from a first ring network interface. The first ring network interface is a ring network interface belonging to the first node. The first node is connected to a second node through the first ring network interface. The first node is connected to a third node through a second ring network interface. The second ring network interface is a ring network interface belonging to the first node. All ring network interfaces of the second node belong to the first sub-ring. All ring network interfaces of the third node belong to the second sub-ring. The first ring network interface belongs to the first sub-ring. The second ring network interface belongs to the second sub-ring. The first data packet includes a ring identifier of the first data packet and a destination medium access control MAC address of the first data packet. The ring identifier of the first data packet is a ring number value of any sub-ring in the multi-ring coupled ring network through which the first data packet is transmitted. The processing unit 1200 is configured to determine, based on the ring identifier of the first data packet, the destination MAC address of the first data packet, and a ring identifier of the first ring network interface, whether a first entry exists in an inter-ring table. A ring identifier of each ring network interface in the dual-ring coupled ring network is a ring number value of a sub-ring to which the ring network interface belongs. The inter-ring table includes a plurality of entries. Each entry includes a correspondence between each of a packet ring identifier, a MAC address, and a ring identifier of a ring network interface used by the first node to receive a packet and an inter-ring network interface. A ring identifier of the inter-ring network interface in each entry is different from the ring identifier of the ring network interface used by the first node to receive a packet. If the processing unit 1200 determines that the first entry exists, the sending unit 1300 is configured to forward the first data packet through an inter-ring network interface corresponding to the first entry. A packet ring identifier in the first entry is the same as the ring identifier of the first data packet. A MAC address in the first entry is the same as the destination MAC address of the first data packet. A ring identifier of a ring network interface used by the first node to receive a packet in the first entry is the same as the ring identifier of the first ring network interface.

Optionally, in an embodiment, the processing unit 1200 is further configured to end an inter-ring forwarding procedure of the first data packet when the first entry does not exist.

Optionally, the receiving unit 1100 and the sending unit 1300 may be alternatively integrated into a transceiver unit, and have both a receiving function and a sending function. This is not limited herein.

In an implementation, the communication apparatus 1000 may be the first node in the method embodiments. In this implementation, the sending unit 1300 may be a transmitter, and the receiving unit 1100 may be a receiver. Alternatively, the receiver and the transmitter may be integrated into a transceiver. The processing unit 1200 may be a processing apparatus.

In another implementation, the communication apparatus 1000 may be a chip or an integrated circuit installed in the first node. In this implementation, the sending unit 1300 and the receiving unit 1100 may be communication interfaces or interface circuits. For example, the sending unit 1300 is an output interface or an output circuit, and the receiving unit 1100 is an input interface or an input circuit. The processing unit 1200 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, to enable the communication apparatus 1000 to perform operations and/or processing performed by the first node in the method embodiments. Optionally, the processing apparatus may include only the processor, and the memory configured to store the computer program is located outside the processing apparatus. The processor is connected to the memory through a circuit/wire, to read and execute the computer program stored in the memory. For another example, the processing apparatus may be a chip or an integrated circuit.

Figure 10:
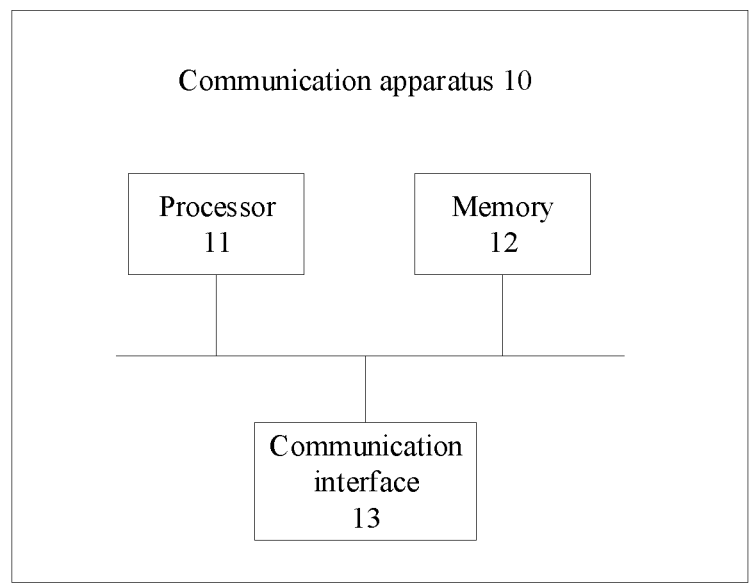
FIG. 10 is a schematic diagram of a structure of a communication apparatus 10 according to the present disclosure.

10. FIG. 10 is a schematic diagram of a structure of a communication apparatus 10 according to the present disclosure. As shown in FIG. 10, the communication apparatus 10 includes one or more processors 11, one or more memories 12, and one or more communication interfaces 13. The processor 11 is configured to control the communication interface 13 to receive and send a signal. The memory 12 is configured to store a computer program. The processor 11 is configured to invoke the computer program from the memory 12 and run the computer program. In this way, procedures and/or operations performed by the first node in the method embodiments of the present disclosure are performed.

For example, the processor 11 may have a function of the processing unit 1200 shown in FIG. 9, and the communication interface 13 may have a function of the sending unit 1300 and/or the receiving unit 1100 shown in FIG. 9. Specifically, the processor 11 may be configured to perform processing or operations performed inside the first node in the method embodiments of the present disclosure, and the communication interface 13 is configured to perform actions of sending and/or receiving performed by the first node in the method embodiments of the present disclosure.

In an implementation, the communication apparatus 10 may be the first node in the method embodiments. In this implementation, the communication interface 13 may be a transceiver. The transceiver may include a receiver and a transmitter.

Optionally, the processor 11 may be a baseband apparatus, and the communication interface 13 may be a radio frequency apparatus.

In another implementation, the communication apparatus 10 may be a chip installed in the first node. In this implementation, the communication interface 13 may be an interface circuit or an input/output interface.

Optionally, the processor and the memory in the foregoing apparatus embodiments may be physically independent units. Alternatively, the memory may be integrated with the processor. This is not limited in this specification.

In addition, the present disclosure further provides a computer-readable storage medium. The computer-readable storage medium stores computer instructions. When the computer instructions are run on a computer, operations and/or procedures performed by the first node in the method embodiments of the present disclosure are performed.

The present disclosure further provides a computer program product. The computer program product includes computer program code or instructions. When the computer program code or instructions are run on a computer, operations and/or procedures performed by the first node in the method embodiments of the present disclosure are performed.

In addition, the present disclosure further provides a chip. The chip includes a processor. A memory configured to store a computer program is disposed independently from a chip. The processor is configured to execute the computer program stored in the memory, so that operations and/processing performed by the first node in any one of the method embodiments are/is performed.

Further, the chip may include a communication interface. The communication interface may be an input/output interface, an interface circuit, or the like. Further, the chip may include the memory.

A processor in an embodiment of the present disclosure may be an integrated circuit chip and capable of processing a signal. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor may be any conventional processor, or the like. The steps of the methods disclosed in embodiments of the present disclosure may be directly performed and accomplished by using a hardware encoding processor, or may be performed and accomplished by using a combination of hardware in the encoding processor and a software module. The software module may be located in a storage medium mature in the art, such as a random-access memory, a flash memory, a read-only memory, a programmable read-only memory or an electrically erasable programmable memory, or a register. The storage medium is located in the memory, and the processor reads information in the memory and accomplishes the steps in the foregoing methods in combination with hardware of the processor.

The memory in embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), and is used as an external cache. Through examples but not limitative descriptions, RAMs in many forms are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DRRAM). It should be noted that the memory of the systems and methods described in this specification includes but is not limited to these and any other proper types of memories.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in embodiments of the present disclosure may be integrated into one processing unit, each of the units may exist alone physically, or two or more units are integrated into one unit.

The term "and/or" in the present disclosure describes only an association relationship between associated objects, and indicates that three relationships may exist. For example, A and/or B may indicate the following three cases: Only A exists, both A and B exist, and only B exists. A, B, and C each may be in a singular form or a plural form. This is not limited.

When the function is implemented in a form of a software functional unit and sold or used as an independent product, the function may be stored in a computer-readable storage medium. Based on such an understanding, the technical solutions of the present disclosure essentially, or the part contributing to the conventional technologies, or some of the technical solutions may be implemented in a form of a software product. The software product is stored in a storage medium, and includes several instructions for instructing a computer device (which may be a personal computer, a server, a network device, or the like) to perform all or some of the steps of the methods described in embodiments of the present disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure.

Therefore, the protection scope of the present disclosure shall be subject to the protection scope of the claims.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, implemented by a first node, and wherein the method comprises:
   connecting to a second node through a first ring network interface belonging to the first node, wherein the first mode is a node in a multi-ring coupled ring network comprising a plurality of sub-rings, wherein a ring identifier of each ring network interface in the multi-ring coupled ring network is a ring number value of a sub-ring to which a ring network interface belongs;
   receiving a first data packet comprising a first ring identifier and a wrapping identifier of the first data packet, wherein the first ring identifier is a first ring number value of any sub-ring in the multi-ring coupled ring network through which the first data packet is transmitted, and wherein the wrapping identifier indicates that the first data packet is a wrapped data packet or a non-wrapped data packet;
   when detecting on the first ring network interface; that a fault exists on a link between the first node and the second node, when the first data packet is a wrapped data packet, and when the first ring identifier is different from a second ring identifier of the first ring network interface, generating, after setting the first ring identifier to the second ring identifier, a second data packet;
   sending the first data packet through the first ring network interface;
   determining a second ring network interface belonging to the first node based on the first ring network interface, wherein the second ring network interface has a same ring identifier as that of the first ring network interface; and
   forwarding the second data packet through the second ring network interface.

2. The method of claim 1, further comprising discarding the first data packet when the first ring identifier is the same as the second ring identifier.

3. The method of claim 1, further comprising:
   when detecting on the first ring network interface; that the fault exists on the link and when the first data packet is the non-wrapped data packet, generating, after setting the wrapping identifier to a value indicating that the first data packet is the wrapped data packet, a third data packet; and
   forwarding the third data packet through the second ring network interface.

4. The method of claim 2, further comprising:
   when detecting on the first ring network interface that the fault exists on the link and when the first data packet is the non-wrapped data packet, generating, after setting the wrapping identifier to a value indicating that the first data packet is the wrapped data packet, a third data packet; and
   forwarding the third data packet through the second ring network interface.

5. The method of claim 1, wherein determining the second ring network interface based on the first ring network interface comprises:
   querying a ring network table based on the first ring network interface, wherein the ring network table indicates a correspondence between an ingress interface and an egress interface, and
   determining the second ring network interface corresponding to the first ring network interface.

6. The method of claim 2, wherein determining the second ring network interface based on the first ring network interface comprises:
   querying a ring network table based on the first ring network interface, wherein the ring network table indicates a correspondence between an ingress interface and an egress interface, and
   determining the second ring network interface corresponding to the first ring network interface.

7. The method of claim 3, wherein determining the second ring network interface based on the first ring network interface comprises:
   querying a ring network table based on the first ring network interface, wherein the ring network table indicates a correspondence between an ingress interface and an egress interface, and
   determining the second ring network interface corresponding to the first ring network interface.

8. The method of claim 4, wherein determining the second ring network interface based on the first ring network interface comprises:
   querying a ring network table based on the first ring network interface, wherein the ring network table indicates a correspondence between an ingress interface and an egress interface, and
   determining the second ring network interface corresponding to the first ring network interface.

9. A first node in a multi-ring coupled ring network comprising a plurality of sub-rings, wherein a ring identifier of each ring network interface in the multi-ring coupled ring network is a ring number value of a sub-ring to which each ring network interface belongs, and wherein the first node comprises:
   a memory configured to store program instructions;
   one or more processors coupled to the memory and configured to execute the program instructions to cause the first node to:
     connect to a second node through a first ring network interface belonging to the first node, wherein the first node is a node in a multi-ring coupled ring network comprising a plurality of sub-rings, wherein a ring identifier of each ring network interface in the multi-ring coupled ring network is a ring number value of a sub-ring to which a ring network interface belongs;
     receive a first data packet comprising a first ring identifier and a wrapping identifier of the first data packet, wherein the first ring identifier is a first ring number value of any sub-ring in the multi-ring coupled ring network through which the first data packet is transmitted, and wherein the wrapping identifier indicates that the first data packet is a wrapped data packet or a non-wrapped data packet;
     when the first node detects, on the first ring network interface that a fault exists on a link between the first node and the second node, when the first data packet is a wrapped data packet, and when the first ring identifier is different from a second ring identifier of the first ring network interface, generate, after setting the first ring identifier to the second ring identifier, a second data packet;

send the first data packet through the first ring network interface;

determine a second ring network interface belonging to the first node based on the first ring network interface, wherein the second ring network interface has a same ring identifier as that of the first ring network interface; and forward the second data packet through the second ring network interface.

10. The first node of claim 9, wherein the program instructions further cause the first node to:

discard the first data packet when the first ring identifier is the same as the second ring identifier.

11. The first node of claim 9, wherein the program instructions further cause the first node to:

when the first node detects on the first ring network interface that the fault exists on the link and when the first data packet is a non-wrapped data packet, generate, after setting the wrapping identifier to a value indicating that the first data packet is the wrapped data packet a third data packet; and forward the third data packet through the second ring network interface.

12. The first node of claim 10, wherein the program instructions further cause the first node to:

when the first node detects on the first ring network interface that the fault exists on the link and when the first data packet is a non-wrapped data packet, generate, after setting the wrapping identifier to a value indicating that the first data packet is the wrapped data packet, a third data packet; and forward the third data packet through the second ring network interface.

13. The first node of claim 9, wherein the program instructions further cause the first node to:

query a ring network table based on the first ring network interface, wherein the ring network table indicates a correspondence between an ingress interface and an egress interface; and determine the second ring network interface corresponding to the first ring network interface.

14. The first node of claim 10, wherein the program instructions further cause the first node to:

query a ring network table based on the first ring network interface, wherein the ring network table indicates a correspondence between an ingress interface and an egress interface; and determine the second ring network interface corresponding to the first ring network interface.

15. The first node of claim 11, wherein the program instructions further cause the first node to:

query a ring network table based on the first ring network interface, wherein the ring network table indicates a correspondence between an ingress interface and an egress interface, and determine the second ring network interface corresponding to the first ring network interface.

16. The first node of claim 12, wherein the program instructions further cause the first node to:

query a ring network table based on the first ring network interface, wherein the ring network table indicates a correspondence between an ingress interface and an egress interface; and determine the second ring network interface corresponding to the first ring network interface.

17. A first node in a multi-ring coupled ring network, and wherein the first node comprises:

a memory configured to store program instructions;

one or more processors coupled to the memory and configured to execute the program instructions to cause the first node to:

connect to a second node through a first ring network interface belonging to the first node and a first sub-ring, wherein all ring network interfaces of the second node belong to the first sub-ring, and wherein the multi-ring coupled ring network comprises the first sub-ring and a second sub-ring that are adjacent to each other;

receive, from the first ring network interface, a first data packet comprising a first ring identifier of the first data packet and a first destination medium access control (MAC) address of the first data packet, wherein the first ring identifier is a ring number value of any sub-ring in the multi-ring coupled ring network through which the first data packet is transmitted;

connect to a third node through a second ring network interface belonging to the first node and the second sub-ring, wherein all ring network interfaces of the third node belong to the second sub-ring; and determine, based on the first ring identifier, the first destination MAC address, and a second ring identifier of the first ring network interface, whether a first entry exists in an inter-ring table; and forward, when the first entry exists, the first data packet through a first inter-ring network interface corresponding to the first entry, wherein a first packet ring identifier in the first entry is the same as the first ring identifier, a first MAC address in the first entry is the same as the first destination MAC address, and a third ring identifier of a third ring network interface used by the first node to receive a packet in the first entry is the same as the second ring identifier of the first ring network interface.

18. The first node of claim 17, wherein the one or more processes are further configured to execute the program instructions to cause the first node to end, when the first entry does not exist, an inter-ring forwarding procedure of the first data packet.

19. The first node of claim 17, wherein the inter-ring table comprises a plurality of entries, and wherein each entry in the inter-ring table comprises a correspondence between each of a second packet ring identifier, a second MAC address, the third ring identifier, and a second inter-ring network interface.

20. The first node of claim 19, wherein a fourth ring identifier of the second inter-ring network interface in each entry is different from the third ring identifier.

* * * * *